(12) United States Patent
Hough et al.

(10) Patent No.: US 7,891,248 B2
(45) Date of Patent: Feb. 22, 2011

(54) APPARATUS FOR MEASURING WALL THICKNESSES OF OBJECTS

(75) Inventors: Gerald William Hough, Derby (GB); Nicholas Barrington Orchard, Bristol (GB); Dean Samuel Robert Whiteside, Ravenstone (GB)

(73) Assignee: Rolls-Royce PLC, London (GB)

( * ) Notice: Subject to any disclaimer, the term of this patent is extended or adjusted under 35 U.S.C. 154(b) by 459 days.

(21) Appl. No.: 11/990,123

(22) PCT Filed: Aug. 8, 2006

(86) PCT No.: PCT/GB2006/002927

§ 371 (c)(1),
(2), (4) Date: Feb. 7, 2008

(87) PCT Pub. No.: WO2007/028441

PCT Pub. Date: Mar. 15, 2007

(65) Prior Publication Data

US 2009/0178482 A1 Jul. 16, 2009

(30) Foreign Application Priority Data

Sep. 7, 2005 (GB) .................... 0518153.2

(51) Int. Cl.
*G01N 29/265* (2006.01)
(52) U.S. Cl. .............. 73/634; 73/629; 73/621
(58) Field of Classification Search ............ 73/634, 73/633, 629, 627, 621, 620, 619, 618
See application file for complete search history.

(56) References Cited

U.S. PATENT DOCUMENTS

| | | | |
|---|---|---|---|
| 3,575,043 A * | 4/1971 | Allen et al. ............... 73/619 |
| 4,166,395 A * | 9/1979 | Dannehl ................... 73/634 |
| 5,189,805 A | 3/1993 | Matsumoto et al. | |
| 5,412,880 A | 5/1995 | Raab | |
| 5,446,673 A | 8/1995 | Bauer et al. | |
| 5,576,492 A * | 11/1996 | Phalin ..................... 73/634 |
| 7,448,271 B2 * | 11/2008 | Duncan et al. ............ 73/634 |
| 2002/0128790 A1 | 9/2002 | Woodmansee | |
| 2005/0126291 A1* | 6/2005 | Czerw et al. ............. 73/589 |
| 2005/0166413 A1 | 8/2005 | Crampton | |
| 2005/0276466 A1 | 12/2005 | Vaccaro et al. | |
| 2009/0165317 A1* | 7/2009 | Little ....................... 33/503 |

FOREIGN PATENT DOCUMENTS

| | | |
|---|---|---|
| EP | 1 526 356 A2 | 4/2005 |
| JP | A-60-86462 | 5/1985 |
| JP | A-63-75511 | 4/1988 |
| WO | WO 94/14108 | 6/1994 |
| WO | WO 2004/033991 A1 | 4/2004 |

* cited by examiner

*Primary Examiner*—Hezron Williams
*Assistant Examiner*—Rose M Miller
(74) *Attorney, Agent, or Firm*—Oliff & Berridge, PLC

(57) ABSTRACT

An apparatus for measuring wall thicknesses of objects, includes a coordinate measuring machine that has a probe holder and an object support. The coordinate measuring machine is configured to provide relative movement between the probe holder and the object support in three dimensions. The apparatus also includes an ultrasonic test probe which is held by the probe holder. The coordinate measuring machine brings the transducer of the ultrasonic test probe into contact with a position on a surface of an object at the object support so that the probe can measure an object wall thickness at the probe contact position.

15 Claims, 1 Drawing Sheet

APPARATUS FOR MEASURING WALL THICKNESSES OF OBJECTS

FIELD OF THE INVENTION

The present invention relates to an apparatus for measuring wall thicknesses of objects, and particularly, but not exclusively, to an apparatus in which the measured wall thicknesses can be converted to spatial coordinates on surfaces of objects.

BACKGROUND OF THE INVENTION

Manufactured objects often have to conform to dimensional and/or geometrical tolerances. These may be specified by the manufacturer or ultimate user of the object e.g. to ensure that the object behaves correctly in service. Thus it is common to subject objects to post-manufacture inspection procedures.

A known technique for determining the dimensional accuracy of objects involves driving a coordinate measuring probe or stylus over the surface of the object. Such a probe typically comprises a stiff elongate member (formed e.g. of carbon fibre) having a small hard (typically industrial ruby) sphere at the measuring end. An example of a commercially available probe is the Renishaw SP600™ analogue scanning probe. In one arrangement, the probe is fitted to a Renishaw MIH™ head providing angular movement about two orthogonal axes in 7.5 increments. The head is then mounted to the quill of a programmable coordinate measuring machine (CMM), which controls the movement of the probe. A typical CMM comprises a quill providing z-direction movement, a carriage assembly which carries the quill and provides x- and y-direction movement, and a measuring table, as shown for example in U.S. Pat. No. 5,189,805. The CMM typically also comprises a programmable computer to control the probe movements. CMMs are commercially available from a number of suppliers.

Sensing means associated with the probe detects when and where the sphere contacts a surface and the CMM translates that information into a spatial coordinate for the surface contact point with the sphere. Thus by making contact with the object at spaced apart points along a programmed guide path, the probe can provide discrete measurements of the relative positions of these points. In this way, shape characteristics (such as profiles or outlines) of the actual object can be built up, and these characteristics can then be compared for conformity with e.g. predetermined tolerance limits.

Conventionally, the operator programs a guide path by a teach-and-learn technique in which he drives the probe under manual control to specific points along the desired guide path, and saves the positions of those points in the memory of the CMM. When performing a measurement run, the CMM subsequently drives the probe from point-to-point in an order determined by the operator, taking measurements along the way. In defining the guide path, the operator will also specify approach directions and probe angles to ensure that the probe or quill does not collide with the object. As and when necessary, the operator may also program the quill to change the probe (usually at a probe change station remote from the object) so that e.g. a probe with a longer elongate member is used to reach otherwise-inaccessible parts of the object.

Gas turbine engine components, and particularly critical components such as blades, vanes and discs, are commonly inspected using such techniques.

A problem can arise, however, when the object under inspection has internal surfaces (which are inaccessible to the probe. For example, it is common for gas turbine blades and vanes to be formed as hollow components, with internal cavities which reduce the weight of the component and/or provide cooling channels. In particular, a known technique for producing hollow titanium alloy fan blades involves superplastic forming of the blade to expand internal blade cavities, followed by acid dipping of the blade to taper etch the external surface and provide the desired aerofoil shape. The external surface may then be linished to give the desired surface finish. However, as a result of these procedures, variability can be introduced into the thickness of the blade walls which define the cavities, i.e. there can be a degree of uncertainty in the positions of the internal surfaces of the cavities.

SUMMARY OF THE INVENTION

Thus an object of the present invention is to provide an apparatus which enables the measurement of wall thicknesses and preferably the spatial coordinates of positions on internal surfaces of an object.

The present invention is at least partly based on the realisation that an ultrasonic test probe can be mounted to a CMM to provide wall thickness measurements at predetermined probe contact positions on an object. If the spatial coordinates of these contact positions are known, each wall thickness measurement can be converted into spatial coordinates for the opposing position on the other side of the wall to the probe contact position.

Thus, in a first aspect, the present invention provides an apparatus for measuring wall thicknesses of objects, the apparatus comprising:

a coordinate measuring machine comprising a probe holder and an object support, the coordinate measuring machine being configured to provide relative movement between the probe holder and the object support in three dimensions; and an ultrasonic test probe which is held by the probe holder; whereby, in use, the coordinate measuring machine brings the transducer of the ultrasonic test probe into contact with a position on a surface of an object at the object support so that the probe can measure an object wall thickness at the probe contact position.

Preferably, the apparatus further comprises an angle adjustment mechanism that adjusts the angle of the ultrasonic test probe when it is brought into contact with said surface so that the measured wall thickness is along a line perpendicular to said surface.

For example, the angle adjustment mechanism may comprise gymbals. The gymbals can connect the probe to the probe holder. In this way, when the probe is offered to the object surface, the gymbals can correct any misalignment between the probe and the surface. However, preferably the probe holder is adapted to provide angular movement of the probe about two or more axes so that the coordinate measuring machine can at least approximately align the probe before it is offered to the object surface.

An object may be located at the object support, the object having walls which on one side are contactable by the ultrasonic test probe and on the other side are not contactable by the probe. For example, the object may be a vane or blade of a gas turbine engine.

Preferably, the coordinate measuring machine further comprises a computer system which (i) controls the probe movements, (ii) commands thickness measurements by the probe, and/or (iii) stores thickness measurements made by the probe. Alternatively or additionally, the computer system can relate each measured wall thickness to one or more reference positions for the object and thereby converts the measured wall thickness into spatial coordinates for the opposing position on the other side of the wall to the probe contact position. For example, the computer system may store the spatial coordinates of each probe contact position, whereby the reference position for each measured wall thickness is the corresponding probe contact position.

Preferably, when the measured object is a component of a gas turbine engine, the computer system defines the spatial coordinates relative to one or more axes and/or directions of the gas turbine engine. For example, the fundamental axes of the coordinates system may include the gas turbine engine centre axis. Typically, when the component is a vane or blade, the axes include the engine centre axis and a radial engine direction along the length of the vane or blade.

Typically, the coordinate measuring machine is also used to measure the spatial coordinates of the probe contact positions. Thus, the apparatus may further comprise at least one coordinate measuring stylus which is interchangeable with the ultrasonic test probe, such that the coordinate measuring stylus can be held by the probe holder when the ultrasonic test probe is not in use. The coordinate measuring stylus is then movable by the coordinate measuring machine into contact with the object at the probe contact positions.

Desirably, the apparatus further comprises a system for delivering couplant to the face of the probe transducer before it is brought into contact with the object. This avoids a human operator having to intervene before each thickness measurement to apply the couplant.

Preferably, the couplant is carried in a reservoir which is mounted to the ultrasonic test probe. More preferably, the apparatus further comprises:

a probe change station where the ultrasonic test probe can be docked when not in use by the coordinate measuring machine; and a larger couplant reservoir which replenishes the reservoir mounted to the ultrasonic test probe when it is docked in the probe change station.

In further aspects, the present invention provides the use of the apparatus of the first aspect for measuring wall thicknesses of objects, and the use of the apparatus of the first aspect for measuring the spatial coordinates of positions on object surfaces which are not directly contactable by the ultrasonic test probe (or indeed conventional tactile CMM probes).

Another aspect of the present invention provides a method for determining spatial coordinates on inaccessible surfaces of objects, the method comprising the steps of:

(a) providing an object having walls which on one side are directly contactable by an ultrasonic test probe and on the other side are not directly contactable by such a probe;

(b) measuring the spatial coordinates of a plurality of probe contact positions on contactable surfaces of the object;

(c) moving an ultrasonic test probe into contact with the object at each probe contact position to measure a wall thickness of the object at that position; and (d) relating each measured wall thickness to the measured spatial coordinates of the corresponding probe contact position to convert the measured wall thickness into spatial coordinates for the opposing position on the non-contactable side of the wall.

Step (c) may include adjusting the angle of the ultrasonic test probe when it is brought into contact with the object so that the measured wall thickness is along a line perpendicular to the contacted surface.

Any one or more of the optional features of the first aspect of the invention may be applied to this aspect of the invention.

For example, the object may be a vane or blade of a gas turbine engine. The spatial coordinates may be defined relative to one or more axes and/or directions of the gas turbine engine. The axes may be the engine centre axis and a radial engine direction along the length of the vane or blade.

BRIEF DESCRIPTION OF TH DRAWINGS

Embodiments of the invention will now be described by way of example with reference to the accompanying drawings in which.

DETAILED DESCRIPTION

Figure 1:
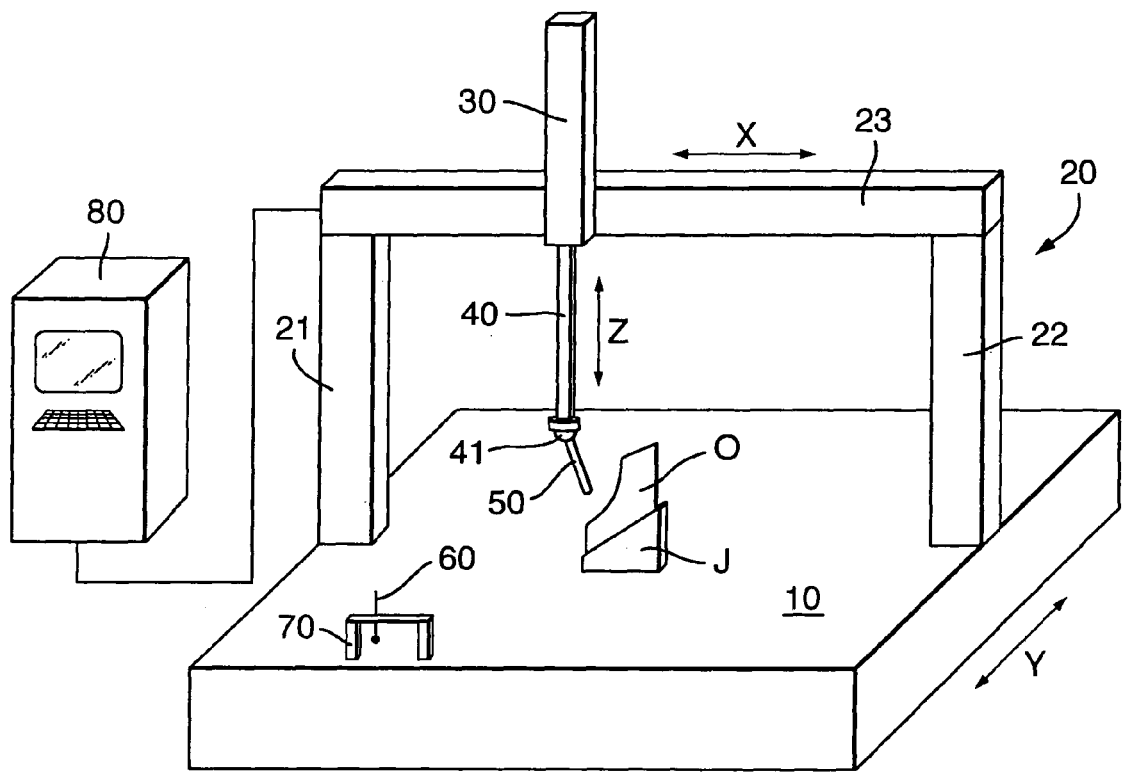
FIG. 1 shows schematically an apparatus according to the present invention.

FIG. 1 shows schematically an apparatus according to the present invention. The apparatus comprises a conventional CMM which includes a table 10 on which an object O to be measured is supported. In the drawing of FIG. 1, the object is a hollow titanium alloy fan blade held in a jig J.

The CMM has a Y-slider device 20 which is movable in the "Y" direction of the table. The Y-slider device has columns 21, 22 at opposing sides of the table which support a beam 23 traversing the table. On the beam, an X-slider device 30 is mounted which is movable in the "X" direction of the table. The X-slider device in turn contains a quill 40 which is movable in the "Z" direction of the table. The lower end of the quill has a head 41 which can detachably hold a measuring probe and provides angular movement of the probe about two orthogonal axes. The measuring probe can be either an ultrasonic test probe 50, or a coordinate measuring stylus 60. As shown in FIG. 1, the ultrasonic test probe is held by the quill, the coordinate measuring stylus being docked in a probe change station 70 of the CMM. However, the quill is drivable to the probe change station to allow the interchange of the probe and the stylus. Thus the CMM can move either the probe or the stylus relative to the fan blade in three dimensions.

The CMM further includes a programmable computer system 80 which controls the movement of the slider devices and quill, and thence the movement of the probe or stylus. Measurement signals from the probe or stylus pass via head 41 and quill 40 to the computer system, where they are stored in memory until needed. Likewise, command signals pass to the probe or stylus from the computer system, to command e.g. the performance of measurements and the ejection of couplant onto the transducer of the ultrasonic test probe.

The titanium alloy fan blade O has walls which define internal cavities. Thus, one side of the walls is formed by the external surface of the blade, and the other side of the walls is formed by internal surfaces which are inaccessible to the probe and the stylus. The processing operation by which the blade is produced is such that there is a degree of uncertainty in the locations of the internal surfaces relative to the external geometry of the blade.

In order to measure spatial coordinates on those internal surfaces, the ultrasonic test probe takes thickness measurements across the walls of the blade. These measurements are related to contact positions on the external surface of the blade. If the spatial coordinates of those contact positions are known, the thickness measurements can be converted into spatial coordinates for opposing positions on the internal surfaces.

Thus a first step is to determine the spatial coordinates of the external contact positions. This can be accomplished by defining a set of coordinate axes for the blade. Conveniently, these axes are the engine centre axis, a radial engine direction along the length of the blade, and a third axis orthogonal to the previous two axes.

Reference markers are provided on the jig. In use, the blade would be mounted in the engine in a predetermined relationship to the engine centre line axis and with its stacking axis aligned with an engine radial direction. The blade is held by the jig such that the reference markers have a known spatial relationship to the defined coordinate axes. Thus the spatial coordinates of the probe and stylus in a coordinate system of the engine can be calibrated with reference to the jig reference markers. That is, at any instant the spatial coordinates of the probe or stylus are known in the coordinates system of the CMM, but by knowing the spatial coordinates of the reference markers in the CMM coordinates system, a simple coordinate transformation allows the CMM spatial coordinates of the probe or stylus to be converted to the engine coordinates system.

With the jig and blade on table 10, and the reference marker positions properly calibrated, the next step is to run coordinate measuring stylus 60 to contact positions on the external surface of the blade in order to measure the spatial coordinates of those positions. This can be accomplished using techniques and procedures known in the art.

The stylus is then returned to probe change station 70 and ultrasonic test probe 50 is picked up by head 41. The probe is driven by the CMM to the contact positions previously visited by the stylus and at each a wall thickness measurement is made.

When the wall thickness measurements are completed, they are converted by the computer system into spatial coordinates for the opposing positions on the internal surfaces of the blade.

Figure 2:
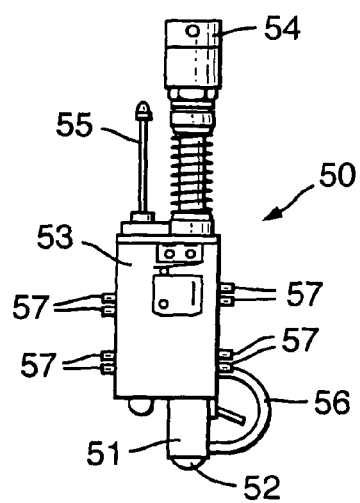
FIG. 2 shows in more detail the ultrasonic test probe of the apparatus of FIG. 1.

FIG. 2 shows probe 50 in more detail. Probe 50 attaches to head 41 at connector 54. The probe has a delay line transducer 51 which emits and receives ultrasonic signals when coupled to the surface of object O. In order to properly couple the transducer to the object surface and to maximise the return signal, the axis of the probe should be perpendicular to the surface. However, although head 41 provides angular movement of the probe about orthogonal axes A and B, the movement proceeds in 7.5° increments. Thus, while the CMM can be programmed to offer the probe to the blade at an angle that is approximately perpendicular to the surface of the blade, in the majority of cases the probe measurement direction will not be precisely aligned.

To overcome this problem, the probe has gymbal mechanisms 52 which automatically adjust the angle of the probe when it contacts the object to so that its axis is perpendicular to the contacted surface. In FIG. 2 one of the gymbal mechanisms is indicated. The other is largely hidden by the body of the probe in FIG. 2, although its eight mounts 57 are just visible. The adjustment effected by the gymbal mechanisms introduces a small degree of uncertainty into the actual contact position of the transducer with the object surface, but for most objects this does not lead to any significant loss in measurement accuracy because the external and internal surface curvatures are small enough such that the thickness measured post-adjustment is essentially the same as the thickness that would have been measured at the nominal contact position. Of course, if necessary the gymbal mechanisms can be adapted to send a signal to the computer system indicating the amount of adjustment and thereby allowing the spatial coordinates of the actual probe contact position to be calculated.

When the CMM has positioned the probe at a contact position, and the gymbal mechanisms have taken out any probe misalignment, the CMM commands the probe to take a thickness measurement. A return signal from the probe to the CMM provides the thickness measurement and an indication of measurement quality. If the measurement quality is insufficient, the CMM can command the probe to take repeat measurements.

Although couplant can be placed on the face of the transducer by the CMM operator before each thickness measurement, for fully automated operation of the probe, application of the couplant can be under the control of the computer system.

The probe shown in FIG. 2 has a couplant reservoir 53 which is carried by the probe. A stepper motor (hidden by the body of the probe in FIG. 2) controlled by the computer system draws couplant from the reservoir and ejects it onto the transducer via hose 56 before the probe is offered to the object surface.

A further and larger couplant reservoir (not shown) is maintained at the probe change station. When the probe is docked at the station reservoir 53, finger 55 activates a switch (not shown) to automatically refill reservoir 53 from the larger reservoir. Typically, the coordinate measuring stylus and the ultrasonic test probe are used in alternation, so reservoir 53 can be refilled when the stylus is in use.

Although the apparatus has been described above in relation to measurements of the spatial coordinates of positions on inaccessible surfaces, it will be apparent that the apparatus can also be use simply to measure wall thicknesses, and that these need not be converted into spatial coordinates.

While the invention has been described in conjunction with the exemplary embodiment described above, many equivalent modifications and variations will be apparent to those skilled in the art when given this disclosure. Accordingly, the exemplary embodiment of the invention set forth above is considered to be illustrative and not limiting. Various changes to the described embodiment may be made without departing from the spirit and scope of the invention.

The invention claimed is:

1. An apparatus for measuring wall thicknesses of objects, the apparatus comprising:
   a coordinate measuring machine comprising a probe holder and an object support, the coordinate measuring machine being configured to provide relative movement between the probe holder and the object support in three dimensions; and
   an ultrasonic test probe which is held by the probe holder;
   whereby, in use, the coordinate measuring machine brings the transducer of the ultrasonic test probe into contact with a position on a surface of an object at the object support so that the probe can measure an object wall thickness at the probe contact position wherein an angle adjustment mechanism that adjusts the angle of the ultrasonic test probe when it is brought into contact with said surface so that the measured wall thickness is along a line perpendicular to said surface,
   wherein a system is provided for delivering couplant to the face of the ultrasonic test probe before the test probe is brought into contact with the object, and
   wherein the couplant is carried in a reservoir which is mounted to the ultrasonic test probe.

2. The apparatus according to claim 1, wherein the angle adjustment mechanism comprises gymbals.

3. The apparatus according to claim 1, wherein the object has walls which on one side are contactable by the ultrasonic test probe and on the other side are not contactable by the probe.

4. The apparatus according to claim 3, wherein the object is a vane or blade of a gas turbine engine.

5. The apparatus according to claim 1, wherein the coordinate measuring machine further comprises a computer system which relates each measured wall thickness to one or more reference positions for the object and thereby converts the measured wall thickness into spatial coordinates for the opposing position on the other side of the wall to the probe contact position.

6. The apparatus according to claim 5, wherein the computer system stores the spatial coordinates of each probe contact position, the reference position for each measured wall thickness being the corresponding probe contact position.

7. The apparatus according to claim 5, wherein the computer system defines the spatial coordinates relative to one or more axes of the gas turbine engine.

8. The apparatus according to claim 7, wherein the axes include the engine centre axis and/or a radial engine direction along the length of the vane or blade.

9. The apparatus according to claim 1, wherein at least one coordinate measuring stylus is interchangeable with the ultrasonic test probe such that the coordinate measuring stylus can be held by the probe holder when the ultrasonic test probe is not in use;

whereby the coordinate measuring stylus is movable by the coordinate measuring machine into contact with the object at the probe contact positions so that the probe can measure the spatial coordinates of the probe contact positions.

10. The apparatus according to claim 1, further comprising:

a probe change station where the ultrasonic test probe can be docked when not in use by the coordinate measuring machine; and a larger couplant reservoir which replenishes the reservoir mounted to the ultrasonic test probe when it is docked in the probe change station.

11. A method for determining spatial coordinates on inaccessible surfaces of objects, the method comprising the steps of:

(a) providing an object having walls which on one side are directly contactable by an ultrasonic test probe and on the other side are not directly contactable by such a probe;

(b) measuring the spatial coordinates of a plurality of probe contact positions on contactable surfaces of the object;

(c) moving an ultrasonic test probe into contact with the object at each probe contact position to measure a wall thickness of the object at that position;

(d) relating each measured wall thickness to the measured spatial coordinates of the corresponding probe contact position to convert the measured wall thickness into spatial coordinates for the opposing position on the non-contactable side of the wall; and (e) delivering couplant to the face of the ultrasonic test probe before the test probe is brought into contact with the object, and the couplant is carried in a reservoir which is mounted to the ultrasonic test probe.

12. The method according to claim 11, wherein step (c) includes adjusting the angle of the ultrasonic test probe when it is brought into contact with the object so that the measured wall thickness is along a line perpendicular to the contacted surface.

13. The method according to claim 11, wherein the object is a vane or blade of a gas turbine engine.

14. The method according to claim 13, wherein in step (b), the spatial coordinates are defined relative to one or more axes of the gas turbine engine.

15. The method according to claim 14, wherein the axes are the stacking axis of the vane or blade, and/or the engine centre axis.

* * * * *